No. 636,934. Patented Nov. 14, 1899.
P. F. WHITE.
SPOKE FOR WHEELS.
(Application filed June 2, 1899.)
(No Model.)
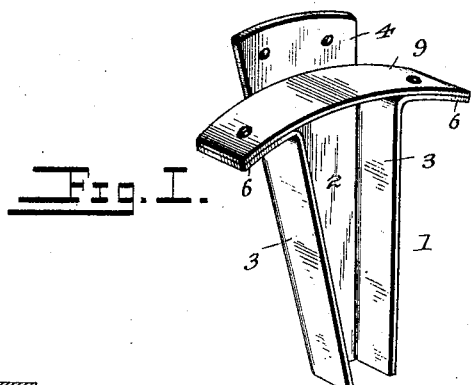
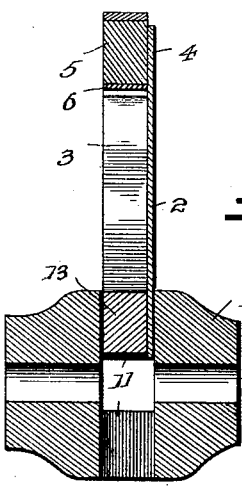
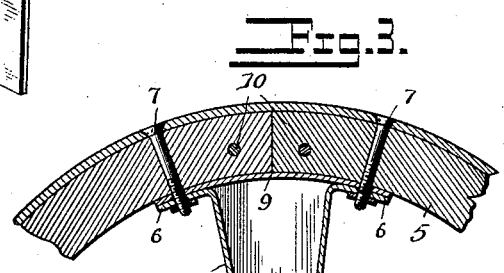
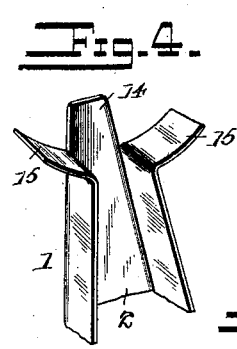
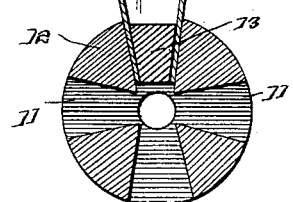
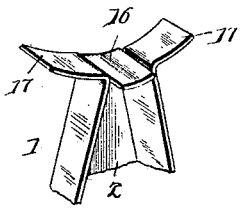
Witnesses
F. E. Alden
J. F. Riley
Patrick F. White, Inventor.
By his Attorneys,
C. A. Snow & Co.
THE NORRIS PETERS CO., PHOTO-LITHO., WASHINGTON, D. C.

UNITED STATES PATENT OFFICE.

PATRICK F. WHITE, OF WESTERNPORT, MARYLAND.

SPOKE FOR WHEELS.

SPECIFICATION forming part of Letters Patent No. 636,934, dated November 14, 1899.

Application filed June 2, 1899. Serial No. 719,091. (No model.)

*To all whom it may concern:*

Be it known that I, PATRICK F. WHITE, a citizen of the United States, residing at Westernport, in the county of Allegany and State of Maryland, have invented a new and useful Spoke for Vehicle-Wheels, Pulleys, &c., of which the following is a specification.

The invention relates to improvements in spokes for vehicle-wheels, pulleys, and the like.

The object of the present invention is to improve the construction of spokes for vehicle-wheels, pulleys, and the like and to increase their strength, durability, and lightness and at the same time lessen their cost of construction.

A further object of the invention is to provide a spoke of this character which will enable the parts of a vehicle-wheel to be readily assembled and which will afford an efficient support for the rim of the wheel and enable the number of spokes therein to be decreased without impairing the efficiency of the wheel.

The invention consists in the construction and novel combination and arrangement of parts, hereinafter fully described, illustrated in the accompanying drawings, and pointed out in the claims hereto appended.

In the drawings, Figure 1 is a perspective view of a spoke constructed in accordance with this invention. Fig. 2 is a longitudinal sectional view showing the spoke applied to a hub and a felly. Fig. 3 is a longitudinal sectional view taken at right angles to Fig. 2.
Figs. 4 and 5 are detail perspective views illustrating modifications of the inner end of the spoke. Fig. 6 is a sectional view showing the spoke arranged to form an oil-reservoir.

Like numerals of reference designate corresponding parts in all the figures of the drawings.

1 designates a hollow spoke designed to be employed on all kinds of wheels, pulleys, and the like and tapering from its inner end and gradually increasing in width from the hub to the rim of the wheel. In Figs. 2 and 3 of the accompanying drawings the spoke is shown applied to a vehicle-wheel of the kind usually employed on wagons and similar vehicles; but I desire it to be understood that the hollow spoke is equally applicable to metal wheels and may be advantageously employed on mining-cars and various other cars. The spoke is composed of a side portion 2 and flanges 3, the side portion being located at the outer face of the wheel and being preferably extended at its outer end beyond the inner periphery of the rim of the wheel to provide a longitudinal end flange 4, which is adapted to support the felly-sections 5. The felly-sections are further supported by laterally-disposed flanges 6, consisting of extensions of the side flanges 3 of the spoke. The laterally-disposed flanges 6, which are arranged at the inner periphery of the rim of the wheel, are secured to the same by the tire-bolts 7, which extend through the felly-sections and through the tire in the usual manner, and the said flanges 6 may be supported by a curved plate 9, extending across the outer end of the spoke and adapted to form a continuous bearing for the adjacent ends of the felly-sections, as clearly illustrated in Fig. 3 of the accompanying drawings. The longitudinal end flange 4 is secured to the felly-sections by transverse fastening devices 10, which may consist of bolts, rivets, or any similar fastening devices. This construction greatly increases the width of the bearing at the outer end of the spoke, and it enables the number of spokes usually employed in vehicle-wheels to be lessened without impairing the strength of the wheel.

The inner end of the tapering spoke is secured in a mortise 11 of a hub 12 by a wedge-shaped key or block 13, which expands the side flanges against the walls of the mortise, whereby the spoke is firmly fixed to the hub. The wedge or key, which is introduced into the hollow spoke at the inner face of the wheel, enables the spokes to be quickly applied to a hub, and the spoke greatly facilitates the assembling of the parts of a wheel.

In Fig. 4 of the accompanying drawings is illustrated a slight modification of the invention, the inner end of the spoke being split at opposite sides, similar to the outer end, to form a longitudinal flange 14, and laterally-disposed flanges 15. The inner longitudinally-disposed flange 14 is designed to extend into the mortise of a hub and is secured therein by means of a wedge-shaped block or key, and the laterally-disposed flanges 15, which extend from opposite sides of the inner longitudinal flange 14, are curved to conform to the configuration of the outer face of the hub and are designed to be secured to the same by any suitable fastening devices.

In Fig. 5 of the drawings is illustrated another modification of the invention, the inner end of the spoke being split similar to that shown in Fig. 4 of the drawings. The side flanges have their inner extensions curved to fit the outer face of the hub, and the flange 16, formed by the inner end of the side or body portion of the spoke, is bent inward at right angles and is curved to fit the hub. The flanges 17, which are arranged at opposite sides of the flange 16, coöperate with the same to form a curved bearing, which extends over a considerable surface of a hub, as will be readily apparent.

One of the hollow spokes of the wheel may be employed as an oil-reservoir, as illustrated in Fig. 6 of the accompanying drawings, and this spoke 18 is designed to have its back closed by a plate 19. The front of the spoke is provided with a suitable filling-opening 20, and the inner end of the reservoir communicates with a perforation 21, which is designed to communicate with the journal-opening of a wheel, whereby the bearing will be lubricated at each revolution of the wheel. Any suitable oil-passage may be provided for conducting the lubricant from the reservoir to the spindle of an axle or the bearing of a shaft, and the oil-receptacle, while being applicable to all kinds of pulleys and wheels, is especially adapted for the wheels of mining-cars and analogous vehicles. In applying the hollow tapering spoke to metal wheels they will be cast integral with the rim and the hub, similar to the spokes of an ordinary metal wheel.

The invention has the following advantages: The hollow tapering spoke, which increases in width from the hub of a wheel to the rim thereof, lessens the cost of the construction of wheels and increases their strength, durability, and lightness. It enables the parts of a wooden vehicle-wheel to be quickly assembled, and as it provides a broad bearing at its outer end it is adapted to brace and support the felly-sections at the joint and at a considerable distance beyond the joint, and it will enable a wheel to be successfully constructed with a less number of spokes than heretofore, and by varying the taper of the spoke an outer bearing of any size may be provided. Also, one of the spokes of a wheel may be conveniently utilized as an oil-reservoir for lubricating an axle, and the lubricant will be supplied to the spindle at each revolution of the wheel.

Changes in the form, proportion, size, and the minor details of construction within the scope of the appended claims may be resorted to without departing from the spirit or sacrificing any of the advantages of this invention, such as varying the construction of the ends of the spoke to adapt it to the character of wheel in which it is to be employed.

What is claimed is—

1. A hollow spoke for wheels and pulleys comprising a flat plate or body forming the front or outer portion of the spoke, and the side flanges extending rearward from the opposite edges of the plate or body, said spoke being open at the back, substantially as described.

2. A hollow spoke for wheels and pulleys comprising a plate or body portion, and side flanges extending longitudinally of the same, said spoke being tapered and gradually increasing in width from the hub of a wheel or pulley to the rim thereof, substantially as described.

3. A hollow tapering spoke comprising a plate or body portion, and longitudinal side flanges, said spoke gradually increasing in width from the hub to the rim of a wheel or pulley and provided at its outer end with a curved bearing conforming to the configuration of and supporting the said rim, substantially as described.

4. A hollow spoke composed of a body portion or plate, and longitudinal side flanges, the body portion or plate being extended beyond the side flanges to form an outer longitudinal rim-supporting flange, and the side flanges being extended laterally and curved to conform to the configuration of a rim, substantially as described.

5. A hollow spoke composed of a body portion or plate, and longitudinal side flanges having their outer ends extended laterally and curved to conform to the configuration of the rim of a wheel or pulley, combined with a curved plate connecting the lateral flanges and forming a continuous bearing, substantially as described.

6. The combination with a hub having a mortise, and a hollow spoke tapering toward the hub, of a wedge-shaped key arranged within the spoke and expanding the sides thereof against the walls of the mortise, the larger end of the wedge being at the outer face of the hub, substantially as described.

7. The combination with a hub having a mortise, of a hollow spoke tapering toward the hub and fitting in the mortise thereof, said spoke being open at the back and composed of a plate or body portion and side flanges, and a wedge-shaped key or block conforming to the configuration of the spoke and adapted to expand the side flanges against the walls of the mortise, substantially as described.

In testimony that I claim the foregoing as my own I have hereto affixed my signature in the presence of two witnesses.

PATRICK F. WHITE.

Witnesses:
J. ROSS COLHOUN,
JOHN P. F. WHITE.